United States Patent [19]
Ayres et al.

[11] 3,779,083
[45] Dec. 18, 1973

[54] METHOD AND APPARATUS FOR MEASURING PRECISE MICRO QUANTITIES OF FLUID SAMPLES

[75] Inventors: Waldemar Ayres, Rutherford; Evelyn Walker, Hackensack; William Holderith; Carl Benson, both of Wyckoff; James Bandrowski, Ridgewood, all of N.J.

[73] Assignee: Becton, Dickinson and Company, East Rutherford, N.J.

[22] Filed: May 28, 1971

[21] Appl. No.: 147,878

[52] U.S. Cl........... 73/425.4 P, 23/230 B, 23/253 R
[51] Int. Cl. ............................................. G01n 1/10
[58] Field of Search .................... 73/425.4 P, 425.6, 73/61 R, 61.1 R; 23/230 B, 253 R

[56] References Cited
UNITED STATES PATENTS

| | | | |
|---|---|---|---|
| 3,475,127 | 10/1969 | Gilford | 73/425.4 P X |
| 3,416,361 | 12/1968 | Asnes et al | 73/61 R |
| 3,518,804 | 7/1970 | Gerarde | 73/425.4 R X |
| 2,540,360 | 2/1951 | Ulvild | 73/425.6 |
| 3,045,494 | 7/1962 | Gerarde | 73/425.6 |
| 3,626,762 | 12/1971 | Gilford | 73/425.6 |

*Primary Examiner*—Richard C. Queisser
*Assistant Examiner*—Joseph W. Roskos
*Attorney*—Kane, Kalsimer, Kane, Sullivan and Kurucz

[57] ABSTRACT

A method for measuring precise micro quantities of fluid samples and apparatus therefor is disclosed which uses a precision, disposable, self-filling capillary tube weakened at a predetermined point between its ends and mounted on a holder. The assembly includes means for protecting the capillary tube from breakage and for severing the capillary tube at the weakened predetermined point transversely across the tube so that the remaining portion or section of the capillary tube will contain a precisely measured volume of fluid to be tested. Optionally, the precisely measured volume of fluid may be mixed with an accurately measured volume of another liquid to thereby obtain a predetermined ratio of mixed liquids.

16 Claims, 14 Drawing Figures

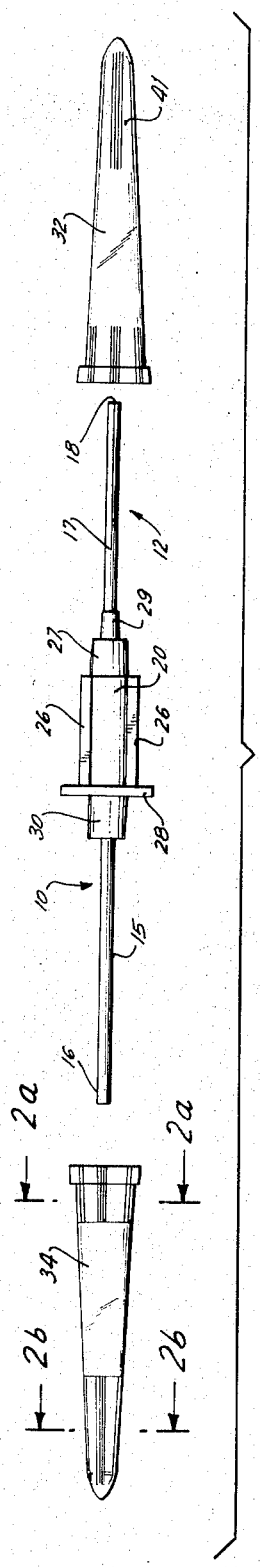
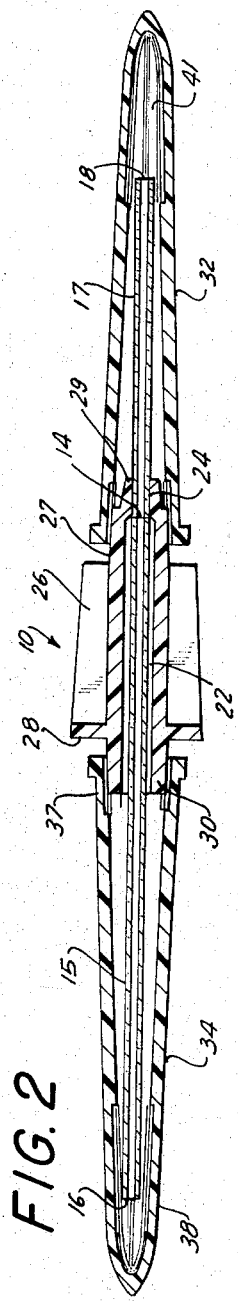
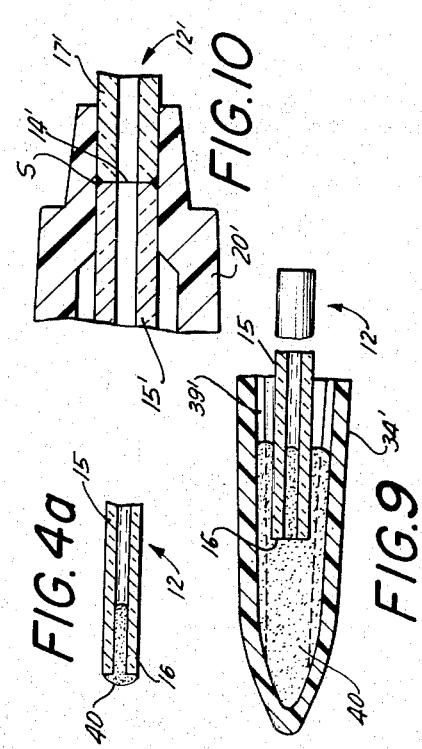
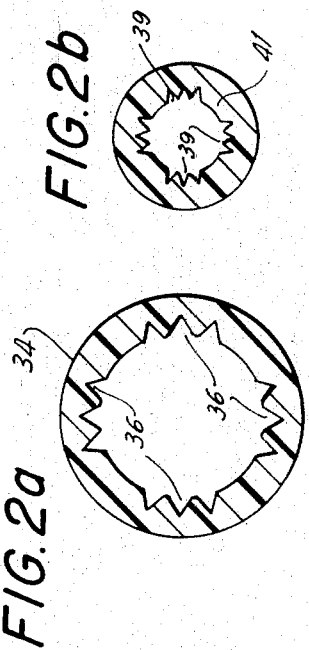
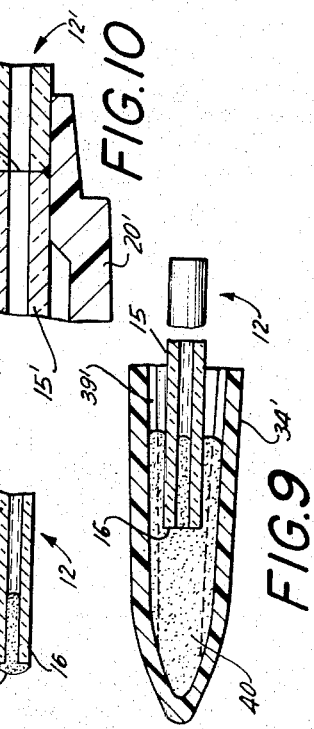

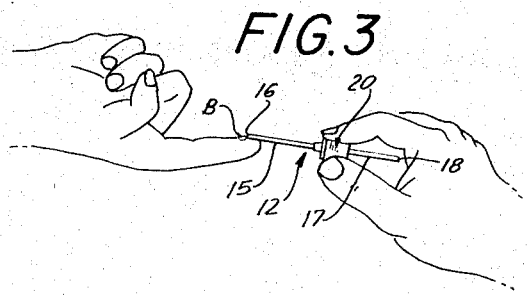
FIG.3
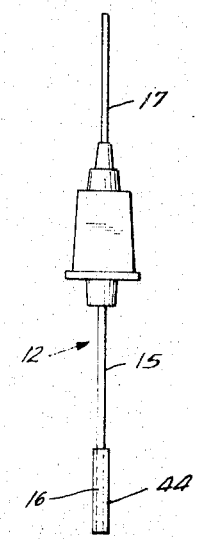
FIG.7
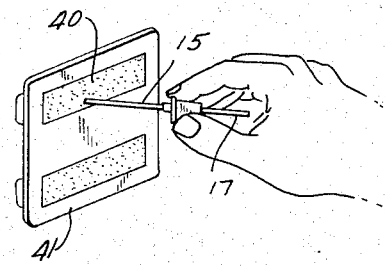
FIG.4
FIG.5
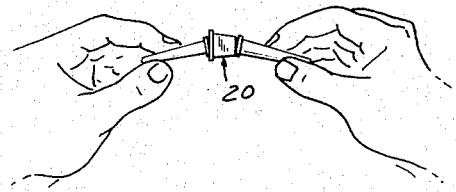
FIG.5A
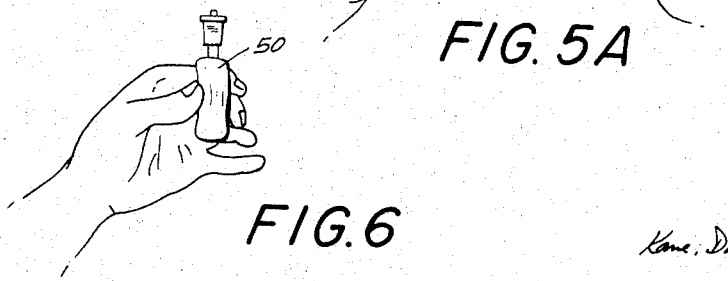
FIG.6
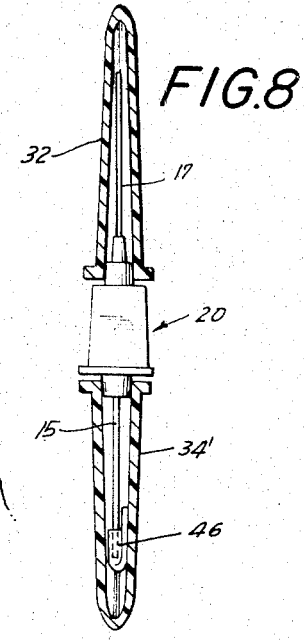
FIG.8
INVENTORS
WALDEMAR AYRES
EVELYN WALKER
WILLIAM HOLDERITH
CARL BENSON
JAMES BANDROWSKI

METHOD AND APPARATUS FOR MEASURING PRECISE MICRO QUANTITIES OF FLUID SAMPLES

BACKGROUND OF THE INVENTION

It is known to employ capillary tubes for the separation of fluids, for example, blood, and after the blood cells have been separated at one end of the capillary tube, the tube is severed so as to obtain a segment thereof containing a precisely measured volume of blood as taught in U.S. Pat. No. 3,475,127. Further, it is also known to employ an apparatus which includes capillary tubes of predetermined length mounted on a holder for collecting a predetermined, accurately measured volume of fluid sample, i.e. plasma, serum or blood for subsequent testing as taught in U.S. Pat. No. 3,045,494.

Employing the inventions of the foregoing assemblies in the U.S. Pat. No. 3,475,127, the capillary tube together with the precisely measured volume of sample is disposed within the reagent, but no means are provided for delivering the precisely measured volume into the reagent for carrying out the test. In U.S. Pat. No. 3,045,494, the sample, i.e., either plasma or serum does not require separation prior to testing. There is no problem for subsequent use of the sample. However, where the fluid to be tested is whole blood or blood treated with an anticoagulant the device of the U.S. Pat. No. 3,045,494 could not be used since the measured volume of sample would also contain blood cells.

SUMMARY OF THE INVENTION

The present invention contemplates a method and apparatus for separating a fluid to be tested into its component parts, i.e., the light component phase and heavy component phase. Preferably, the fluid to be tested is blood which is separated into its light component phase, i.e., plasma or serum and the heavy component phase including cells and/or precipitated protein. This is accomplished by providing an assembly which includes a precision, disposable, self-filling capillary tube weakened at a predetermined point or zone between its ends and is mounted in a holder. The holder is provided with means for removably mounting vented sheaths or shields for protecting the capillary tube from contamination and/or breakage and for severing the capillary tube at the weakened predetermined point or zone after the capillary tube has been filled with a sample, plugged at one end and the sample separated into its component parts of liquid and solid phases. The remaining portion of the capillary tube mounted in the holder will contain a precisely measured volume of fluid which is ready for testing.

The invention also contemplates employing an apparatus for mixing the precisely measured volume of fluid sample in an accurate predetermined ratio with a diluent in a disposable resilient container.

The present invention overcomes the difficulties encountered with the prior art assemblies by providing a disposable apparatus which is adapted to deliver a precise predetermined volume of fluid sample to be tested and providing means for withdrawing the sample from the capillary tube without depositing the capillary tube and sample into a diluent. Further, the present invention provides a simple inexpensive apparatus for accurately and precisely measuring a sample to be tested and separating the sample into its component parts and then severing the capillary tube so as to provide an apparatus which is adapted to deliver the precisely measured sample into a diluent to form a mixture of different materials in an accurate predetermined ratio.

DESCRIPTION OF THE DRAWINGS

FIG. 1 is an exploded view of the apparatus for carrying out the invention herein.

FIG. 2 is a sectional view of the apparatus fully assembled prior to use.

FIG. 2a is a sectional view taken along the lines 2a of FIG. 1.

FIG. 2b is a sectional view taken along the lines 2b of FIG. 1.

FIGS. 3, 4, 5, 5a, and 6 depict the sequences of steps employing the apparatus of the invention herein.

FIG. 4a is an enlarged fragmentary sectional view of the plugged end of the capillary tube depicted being plugged in FIG. 4.

FIG. 7 is another form of the apparatus which provides means for plugging or closing the end of the capillary tube.

FIG. 8 is a sectional view similar to FIG. 2 which employs the closure means shown in FIG. 7.

FIG. 9 is an enlarged fragmentary sectional view of another form or means for plugging the end of the capillary tube.

FIG. 10 is an enlarged fragmentary view of another form of capillary tube which may be used in our device.

DESCRIPTION OF THE PREFERRED EMBODIMENTS

A better understanding of the invention will be had by referring principally to FIGS. 1 and 2. The apparatus or assembly 10 which is employed for separating precise quantities of fluid sample into its component parts, that is, a liquid phase and a solid phase includes a capillary tube 12 which has formed therearound a weakened point or zone 14. The capillary tube is made such that it is a precision, disposable, self-filling tube and has a bore so that a unit length of the capillary tube will contain a predetermined known volume of fluid. Where an assembly of a known volume, for example, 10, 20, 30, 40 or 50 microliters is desired the weakened point formed on the capillary tube will be disposed or positioned a predetermined known distance from one end. The portion 15 of the capillary tube from the weakened zone 14 to end 16 is of indeterminate length and need not be known and it will be subsequently discarded. The segment 17 of capillary tube 12 from the weakened zone 14 to the end 18 will be of a predetermined known volume and will be the portion or segment of the tube that will be retained for delivering a predetermined known volume of sample to be tested.

Capillary tube 12 is mounted in holder 20 between the ends 16 and 18 of capillary tube 12. Holder 20 is formed having a bore 22 extending longitudinally therethrough and has a zone of reduced diameter 24 for mounting capillary tube 12 in fixed position. Zone 24 forms a portion of bore 22 which has a diameter which is an interference fit relative to capillary tube 12. Portions of holder 20 extend about weakened point or zone 14. Preferably holder 20 is mounted on capillary tube 12 so that the weakened zone 14 lies within the interface of bore 22 at the point where reduced zone 24 meets bore 22. Thus, the segment defined between weakened zone 14 and capillary tube end 16 is the portion 15 of the capillary which will subsequently be discarded.

Holder 20 is provided with finger engaging faces 26 which extend parallel to the longitudinal axis thereof and terminate between the ends of holder 20. The forward end of holder 20 forms a tapered tip or hub portion 27 and terminates in a reduced tapered tip portion 29 which defines portions of bore 22 forming reduced diameter zone 24. Tapered tip or hub portion 27 has removably mounted thereon shield 32. The rearward portion of holder 20 is provided with a transversely extending shoulder or partition 28 and extending therefrom is a tapered tip portion 30 which is the mounting means for removably mounting shield 34. Shields 32 and 34 are of similar construction and design and, therefore, only shield 32 will be described. The structure and design of shields 32 and 34 may best be understood by FIG. 1, 2, 2a and 2b. Shields 32 and 34 are formed such that venting openings or channels 36 are provided on the interior surfaces thereof. Venting channels 36 are formed around the open end 37 and extend a sufficient distance along the interior so as to be of greater length than tapered portions 27 and 30 of holder 20. Thus, when shields 32 and 34 are removably mounted on holder 20 the air in the interior portions of the assembly will be at atmospheric pressure and the venting channels 36 provide means for equalizing the air pressure between the interior of the apparatus and exterior portions thereof.

A second group of channels 39 is provided adjacent the closed end 38 of shields 32 and 34 and are useful for several reasons. Channels 39 are intermittently spaced to form windows 41 around the interior circumference so that tip 18 of assembly 10 will be clearly visible through the windows 41. This will enable the technician employing the apparatus to determine if end 18 of capillary tube 12 is completely filled with fluid. If the capillary tube 12 is not completely filled with fluid steps can be taken to completely fill capillary tube 12 as will be described with respect to FIGS. 3 through 6 hereinafter. Channels 39 of shield 34 also provide air escaping means or routes when finely divided materials such as clay are disposed in end 38 of shield 34 as seen in FIG. 9. It has been found that the channels facilitate the filling of the end of the shield when these channels or grooves are formed in the closed end of the shield.

FIG. 9 illustrates a means for plugging the end of capillary tube 12 at end 16. Clay such as is sold under the trademark SEAL EASE by Clay Adams has been found to be quite suitable. Of course any other finely divided material which will efficiently plug the end of the capillary tube 12 may be used. Obviously, the material employed should be inert to the liquid to be tested and to the assembly employed. Finely divided clay 40 is disposed in end of shield 34' and is ready for use after capillary tube 12 is filled with a fluid sample. Shield 34' is then telescoped over capillary tube 12 at end 16 and is removably mounted on holder 20 at tapered tip 30 and is illustrated in FIG. 9. The actual use of shield 34 will be further discussed herein after explaining the use of the apparatus herein.

FIGS. 7 and 8 illustrate another form of our invention and differs from the assembly shown in FIGS. 1 and 2 by a resilient tubular sleeve 44. Sleeve 44 is mounted at one end of capillary tube 12 at end 16 so that a major portion of sleeve 44 extends beyond end 16. The other end of sleeve 44 is mounted in closely fitting relation to end 16 so that a flap 46 will be formed when shield 34' is mounted on holder 20 as shown in FIG. 8. The flap 46 of resilient sleeve 44 is folded upon itself to form a closed or plugged end. Thus, in the embodiment of FIGS. 7 and 8 a plug of finely divided material is not required.

For a better understanding of the operation of our invention reference is made to FIGS. 3 through 6. The assembly 10 of FIG. 1 is grasped in one hand at holder 20 so that the thumb and forefinger engage finger engaging flanges 26 of holder 20. Vented shields 32 and 34 are removed exposing both ends of capillary tube 12. Where blood is to be collected and a test is to be performed on the plasma, any suitable and convenient source of patient's blood may be used. For example, a finger puncture may be made utilizing one of the fingers so that blood "B" will readily fill capillary 12 by capillary action. The finger should be held palm side up to prevent dripping or running off or excess blood. Holder 20 is grasped as in FIG. 3 being careful not to touch any of the surfaces of capillary tube 12 with the hand. The capillary tube 12 is held in a substantially horizontal position by holder 20 and end 16 of capillary tube 12 is placed in the drop of blood "B" formed on the finger. Blood will completely fill the bore of capillary tube 12. End 16 is removed from the drop of blood "B" while capillary tube is held in a horizontal position as shown in FIG. 3, capillary tube portion 15 is wiped free of any blood remaining on the external surfaces thereof, with care being taken not to touch the end portion 16. End 16 is then gently but firmly immersed or pushed into finely divided clay 40 which is held in a container 41 as shown in FIG. 4. After end 16 has been plugged, as illustrated in FIG. 4a, excess blood is removed from the external surfaces 18, that is, the volume of the clay plug which is forced into the bore of the capillary tube 12 at end 16 will displace an equivalent amount of blood at end 18. This excess must be removed by carefully wiping the exterior surface of the capillary adjacent to the end using an absorbent tissue.

Shields 32 and 34 are then mounted in position as shown in FIG. 2. The assembly is then ready for centrifuging and is placed plug side down in the centrifuge. Any suitable laboratory centrifuge may be employed, no special equipment is required. The assembly is rotated at high speed for a relatively short period of time. The blood cells and other heavy/phase component materials of the blood will be packed at the plug end. Capillary tube 12 will then contain two phases of material within the bore thereof, a light component, i.e., the plasma or serum extending from end 18 beyond weakened zone 14 and a heavy phase component containing blood cells and/or precipitated protein and a portion of the liquid component phase extending between the end 16 and weakened zone 14. It should be understood that by experience the length of capillary tube 12 between weakened zone 14 and end 16 should be great enough to hold all of the blood cells and a portion of plasma or serum to ensure that the accurately measured predetermined volume of capillary tube 12 defined between weakened zone 14 and end 18 will always be completely filled with lighter phase fluid, i.e., plasma or serum.

To sever the portion of the capillary tube 12 at weakened zone 14, all that is required is to grasp the assembly 10 as shown in FIG. 5 and gently but firmly bend shields 32 and 34 inwardly. The tapered joint 30 permits shield 34 to move so as to place a pressure on end 16 of capillary tube 12 and cause it to rupture or sever at weakened zone 14. After the capillary tube 12 is severed, the severed portion 15 will be loosely and slidably supported in bore 22 of holder 20. To remove severed section 15 of capillary tube 12 vented shield 34 is removed from holder 20 as shown in FIG. 5a. The capillary portion 17 of the assembly 10 remains intact, that is, the zone of capillary tube 12 defined between weakened zone 14 and end 18 is protected by shield 32 and the accurately measured fluid is ready to be mixed in a manner illustrated in FIG. 6.

FIG. 6 employs a resilient container having an opening at the top thereof substantially the diameter of tapered tip 27 of holder 20. Disposed in resilient container 50 is an accurately measured diluent which is ready for use in performing a test on the precisely measured fluid contained in portion 17 of capillary tube 12. By removing shield 32, then squeezing container 50 and attaching it to the tapered tip 27 as shown in FIG. 6, the liquids are ready for mixing. By relieving the pressure on the resilient container the liquid contained in capillary portion 17 is sucked into the diluent and by repeating the action of compression and releasing, the bore of the capillary tube 12 will be rinsed, thus obtaining a mixture of different materials in an accurate predetermined ratio.

FIG. 9 referred to above presents an alternate procedure for plugging end 16 of capillary tube 12. Instead of tamping clay into the bore of capillary tube 12, shown completed in FIG. 4a, the modified form shown in FIG. 9 for plugging end 16 of capillary tube 12 may be employed. Shield portion 34', similar to shield 34, in which clay or finely divided particulate material 40 is disposed in the end thereof, is provided in place of the container of FIG. 4. The shield is placed over the capillary tube 12 so that end 16 is embedded into the finely divided material 40 as shown in FIG. 9. When the fluid contained in the bore of capillary tube 12 has been separated, the procedure outlined for FIGS. 5 through 6 is followed. In the procedure shown in FIG. 5a, the severed portion of capillary tube 12 will automatically be withdrawn since end 16 of the capillary tube 12 will be embedded in clay 40 and both the shield and segment 15 of capillary tube 12 will be discarded.

It is obvious that various modifications may be made to the present assembly without detracting from the invention herein described. For example, in FIG. 10, capillary tube 12' may be made in two segments, the first segment 17' being the accurate predetermined volume which would be similar to segment 17 mounted in holder 20, and the second segment 15' being that portion defined between the weakened point 14' and end 16' not shown. These segments 15' and 17' are mounted in holder 20' in abutting end to end relationship to form an axially aligned longitudinal passage. The segment 15' defined between weakened point 14' and end 16' is removably mounted in holder 20'. End 16' may be plugged in the same or similar fashion as defined herein. The segment is then removed from the holder 20' by exerting a slight pulling force away from the abutting ends and is subsequently discarded. The zone or point 14' where the capillary tubes are abutting is conveniently sealed by employing a small amount of silicone or other like material to maintain a seal therebetween.

Throughout the specification and in the appended claims the term "plasma" has been used as a convenient illustrative example. However, it should be understood to include both "plasma" and "serum." Also any fluid having a light component phase and a heavier component phase which is capable of separation and suitable for use in the device herein may be employed in such a device.

I claim:

1. The disposable apparatus useful for separating a precise volume of liquid sample comprising a precision, self-filling capillary tube weakened at a predetermined point between its ends and adapted to be severed at said point to form a first zone of predetermined known volume and a second zone, holder having a longitudinally extending bore therethrough, said capillary mounted in said bore with portions of said holder extending around said first and second zones; closure means disposed at the open end of said second zone of said capillary and means mounted on said holder for shielding said capillary tube and for severing said capillary tube at said weakened point whereby said first zone remains mounted on said holder and contains a precise known volume of said liquid.

2. The disposable apparatus of claim 1 which further includes removable shield means removably mounted on said holder for enclosing portions of said first and second zones of said capillary.

3. The disposable apparatus as set forth in claim 2 wherein said shield means includes a pair of shields having venting means radially disposed around the open end thereof so as to readily equalize the air pressure outside and inside said apparatus when said shield means are removably mounted on said holder.

4. The disposable apparatus as set forth in claim 2 wherein said closure means includes a tubular sleeve formed of resilient material mounted on said capillary and disposed at the open outer end of said second zone, said tubular sleeve adapted to be bent upon itself to close the open outer end of said second zone in sealing position when a shield is mounted on said holder and disposed around the second zone of said capillary so that the closed end of said shield causes the resilient material to bend upon itself to form a shield.

5. The disposable apparatus as set forth in claim 1 wherein the closure means is an amorphous adhesive material.

6. The disposable apparatus as set forth in claim 5 wherein the amorphous adhesive material is a nonhardening clay in finely divided form.

7. The disposable apparatus as set forth in claim 1 wherein said closure means includes a sealing material in finely divided form disposed in a shield having venting flutes formed around the closed inner end of said shield and around the inner surface of the open outer end so that when the shield having the sealing material disposed therein is mounted on the holder the end of the capillary portion of said second zone is embedded in the sealing material with portions of the sealing material being disposed within the capillary bore thereby sealing the end of the second zone.

8. The disposable apparatus as set forth in claim 1 wherein said capillary tube includes a first capillary portion of predetermined known volume and a second capillary portion, said first and second portions of said capillary mounted in said holder in endwise abutting position and in axial alignment therewith and in sealing engagement therewith said second capillary portion being adapted to be removably mounted from said holder.

9. The disposable apparatus useful for separating a precise volume of liquid sample comprising;
   a precision, self-filling capillary tube weakened at a predetermined point between its ends and adapted to be severed at said point to form a first section of predetermined known volume and a second section, a holder having a longitudinally extending bore therethrough disposed intermediate the tube ends;
   said capillary mounted in said bore with portions of said holder extending around said first and second sections; and
   means associated with said holder to shield said capillary tube and for cooperating in severing said capillary tube at said weakened point whereby said first zone remains mounted on said holder and contains a precise known volume of said liquid.

10. A method for separating a precise known volume of liquid contained in a disposable apparatus having a capillary tube mounted in a holder, said capillary tube having a weakened point formed between the ends thereof so as to form a first zone of predetermined known volume and a second zone with portions of the holder disposed around the first and second zones of said capillary comprising:
   filling said capillary tube with a liquid mixture;
   sealing the capillary tube at the open outer end of the second zone;
   mounting removable shield means on said holder, said shield means including air venting means disposed around the inner surface of the open end;
   separating the liquid mixture so that the first zone of said capillary is completely filled with a liquid sample; then severing the capillary tube at the weakened point and removing the second zone from said holder whereby a precise known volume of liquid sample is disposed in the first zone and is ready for subsequent testing.

11. The method of separating a precise known volume of liquid sample as set forth in claim 10 which includes the further step of mixing a precisely known volume of liquid sample with an accurately measured volume of diluent in a resilient disposable container to thereby form an accurate predetermined ratio of liquid sample and diluent.

12. The method of separating a precise known volume of liquid sample as set forth in claim 10 wherein the capillary tube is sealed with an amorphous adhesive material.

13. The method of separating a precise known volume of liquid sample as set forth in claim 12 wherein the sealing material is a finely divided non-hardening clay.

14. The method of separating a predetermined amount of a first component comprising a liquid fraction obtained from blood and mixing a predetermined amount of a second liquid with said first liquid to obtain a predetermined ratio of mixture, said method comprising:
   filling a capillary tube with blood comprising a mixture of light and heavy components;
   sealing an end of said capillary tube;
   separating the blood into its light and heavy component fractions in said capillary tube;
   severing the capillary tube into two segments comprising a first segment containing a predetermined amount of said light component fraction and a second zone containing heavy component fraction material;
   said first segment being mounted on a support means having means for coupling to a resilient container;
   mixing the predetermined amount of light component fraction with a predetermined amount of said second liquid in said container by first squeezing said container before coupling said support means to said container and then releasing said container and then alternately squeezing and releasing said container to remove all of said first liquid from said capillary tube to obtain a predetermined ratio mixture.

15. The method of claim 14 wherein the light and heavy component phases of said first liquid is separated by centrifuging.

16. The method of separating a plasma or serum from blood as a first component and mixing a predetermined volume of said first component with a predetermined volume of a second liquid to obtain an accurate ratio of mixture, said method employing an assembly including a capillary tube with a weakened region adapted for breaking and located at a rigid support portion of a holder member, said holder member adapted to also support two removable shield members having venting means and enclosing the opposite ends of said capillary, said weakened region being adapted for breaking said capillary into a first segment of predetermined volume for plasma or serum and a second segment for packed red cells to be discarded, with the shield enclosing the second segment also enclosing capillary sealing means, said holder member adapted to be coupled in sealing engagement with a resilient container holding said second liquid, the said method comprising the steps of:
   removing said shields from said holder while grasping the assembly by said holder to avoid contaminating the capillary tube;
   filling the capillary tube with blood;
   sealing the outer end of the second segment of the capillary tube and enclosing said second segment by coupling one of said shields to the holder;
   wiping off overflow blood at the open end of the first segment of the capillary tube;
   enclosing and protecting the first segment of the capillary tube by coupling the other shield to the holder;
   centrifuging the blood to separate it in the capillary into plasma or serum and to completely fill the first segment and part of the second segment with plasma or serum while forcing all of the red cells into the second segment of the capillary;
   applying a force normal to the assembly to cause the shield enclosing said second segment to move and contact the capillary tube so as to break the capillary at its weakened region while maintaining the capillary in uncontaminated condition while subjecting the assembly to breaking stresses without physically contacting the capillary;
   maintaining atmospheric conditions within the assembly by the venting means formed on said shields while the assembly is in use and prior to mixing with said second liquid to obviate volumetric changes due to changes in pressure caused when said shield is being coupled to or removed from said holder;

removing the shield enclosing said second segment of the capillary and then removing said second segment;

removing the shield enclosing said first segment;

squeezing the resilient container to reduce its volumetric capacity;

coupling the resilient container to said holder;

releasing the resilient container to suck the predetermined volume of plasma or serum into the resilient container to mix with the predetermined volume of the second liquid contained therein; and alternately squeezing and releasing the resilient container to thoroughly rinse said first segment and thoroughly mix the two liquids in an accurate predetermined ratio.

* * * * *